(12) United States Patent
Kato et al.

(10) Patent No.: US 7,898,126 B2
(45) Date of Patent: Mar. 1, 2011

(54) INVERTER-INTEGRATED ROTATING ELECTRIC MACHINE HAVING IMPROVED THERMAL CHARACTERISTICS

(75) Inventors: Masaki Kato, Tokyo (JP); Hiroyuki Akita, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 680 days.

(21) Appl. No.: 11/455,698

(22) Filed: Jun. 20, 2006

(65) Prior Publication Data
US 2007/0024133 A1 Feb. 1, 2007

(30) Foreign Application Priority Data
Jul. 27, 2005 (JP) ................................. 2005-216686

(51) Int. Cl.
*H02K 9/00* (2006.01)
*H02K 5/00* (2006.01)
*H02K 9/02* (2006.01)
*H02K 9/04* (2006.01)
*H02K 5/20* (2006.01)
*H02K 5/22* (2006.01)

(52) U.S. Cl. .............. 310/58; 310/52; 310/60 R; 310/62; 310/64; 310/71; 310/85; 310/89

(58) Field of Classification Search .................... 310/58, 310/52, 45, 68 D, 140, 193, 216, 263, 179, 310/71, 180, 60 R, 62, 64, 85, 89; 29/596, 29/597, 854; H02K 11/00, 5/18, 9/06, 9/02, H02K 19/02, 19/36, 9/00, 9/04, 5/00, 5/20, H02K 5/22

See application file for complete search history.

(56) References Cited

U.S. PATENT DOCUMENTS

| 4,488,070 | A | * | 12/1984 | Iwaki et al. | 310/62 |
| 4,739,204 | A | * | 4/1988 | Kitamura et al. | 310/68 D |
| 4,955,944 | A | * | 9/1990 | Aso et al. | 310/54 |
| 4,980,588 | A | * | 12/1990 | Ogawa | 310/68 D |
| 5,729,063 | A | * | 3/1998 | Adachi et al. | 310/68 D |
| 5,742,107 | A | * | 4/1998 | Asao et al. | 310/62 |
| 5,977,668 | A | * | 11/1999 | Yoshioka | 310/62 |
| 6,023,112 | A | * | 2/2000 | Asao | 310/58 |
| 6,060,802 | A | * | 5/2000 | Masegi et al. | 310/68 D |

(Continued)

FOREIGN PATENT DOCUMENTS

JP 06-046547 A 2/1994

(Continued)

*Primary Examiner* — Quyen Leung
*Assistant Examiner* — Michael Andrews
(74) *Attorney, Agent, or Firm* — Sughrue Mion, PLLC

(57) ABSTRACT

An inverter-integrated rotating electric machine includes an enclosure in which a vent hole is formed, an AC motor accommodated in the enclosure, the AC motor including a rotor and a fan whose rotation introduces external air into the enclosure from outside through the vent hole, the fan being fixed to the rotor, and an inverter unit accommodated in the enclosure and disposed in the vent hole. The inverter unit includes a power circuit portion and a control circuit portion whose control board is housed in a case which thermally isolates the control board from the power circuit portion. The power circuit portion is located at a position facing the fan and the control circuit portion is located upstream of the power circuit portion with respect to an inflow of the external air. Signal lines from the power circuit portion are connected to signal lines from the control circuit portion through holes formed in the case.

10 Claims, 5 Drawing Sheets

U.S. PATENT DOCUMENTS

| | | | | |
|---|---|---|---|---|
| 6,081,054 | A * | 6/2000 | Kashihara et al. | 310/68 D |
| 6,114,783 | A * | 9/2000 | Asao | 310/58 |
| 6,169,344 | B1* | 1/2001 | Tsuruhara | 310/58 |
| 6,172,433 | B1* | 1/2001 | Asao | 310/62 |
| 6,172,434 | B1* | 1/2001 | Oohashi et al. | 310/71 |
| 6,198,187 | B1* | 3/2001 | Asao et al. | 310/68 D |
| 6,201,335 | B1* | 3/2001 | Higashino et al. | 310/263 |
| 6,218,747 | B1* | 4/2001 | Tsuruhara | 310/54 |
| 6,236,557 | B1* | 5/2001 | Kashihara et al. | 361/301.3 |
| 6,239,518 | B1* | 5/2001 | Matsubara et al. | 310/58 |
| 6,285,105 | B1* | 9/2001 | Asao et al. | 310/208 |
| 6,291,913 | B1* | 9/2001 | Nikawa et al. | 310/68 R |
| 6,333,582 | B1* | 12/2001 | Asao et al. | 310/263 |
| 6,366,000 | B1* | 4/2002 | Higashino et al. | 310/260 |
| 6,369,485 | B1* | 4/2002 | Oohashi et al. | 310/263 |
| 6,373,166 | B1* | 4/2002 | Asao et al. | 310/263 |
| 6,426,575 | B1* | 7/2002 | Masegi et al. | 310/68 D |
| 6,441,526 | B1* | 8/2002 | Oohashi et al. | 310/184 |
| 6,441,527 | B1* | 8/2002 | Taji et al. | 310/201 |
| 6,448,681 | B1* | 9/2002 | Matsunaga et al. | 310/179 |
| 6,455,972 | B1* | 9/2002 | Asao et al. | 310/184 |
| 6,462,440 | B1* | 10/2002 | Asao et al. | 310/51 |
| 6,469,408 | B2* | 10/2002 | Asao | 310/62 |
| 6,486,586 | B2* | 11/2002 | Higashino et al. | 310/263 |
| 6,498,414 | B2* | 12/2002 | Asao | 310/184 |
| 6,501,204 | B1* | 12/2002 | Oohashi et al. | 310/179 |
| 6,501,205 | B1* | 12/2002 | Asao et al. | 310/184 |
| 6,501,207 | B2* | 12/2002 | Oohashi et al. | 310/263 |
| 6,507,137 | B2* | 1/2003 | Asao et al. | 310/208 |
| 6,509,660 | B1* | 1/2003 | Asao | 310/63 |
| 6,538,352 | B2* | 3/2003 | Asao | 310/68 D |
| 6,552,463 | B2* | 4/2003 | Oohashi et al. | 310/207 |
| 6,566,781 | B2* | 5/2003 | Oohashi et al. | 310/216 |
| 6,617,718 | B2* | 9/2003 | Oohashi et al. | 310/62 |
| 6,628,035 | B2* | 9/2003 | Takahashi et al. | 310/239 |
| 6,657,336 | B2* | 12/2003 | Morikaku et al. | 310/68 D |
| 6,657,352 | B1* | 12/2003 | Asao et al. | 310/180 |
| 6,661,146 | B2* | 12/2003 | Oohashi et al. | 310/179 |
| 6,664,677 | B2* | 12/2003 | Tanaka et al. | 310/71 |
| 6,674,193 | B2* | 1/2004 | Asao | 310/68 D |
| 6,674,194 | B2* | 1/2004 | Asao | 310/68 D |
| 6,700,243 | B2* | 3/2004 | Asao | 310/68 D |
| 6,710,496 | B2* | 3/2004 | Fujita et al. | 310/201 |
| 6,713,928 | B2* | 3/2004 | Takizawa et al. | 310/214 |
| 6,717,316 | B2* | 4/2004 | Asao et al. | 310/179 |
| 6,735,071 | B2* | 5/2004 | Oohashi et al. | 361/306.1 |
| 6,791,228 | B2* | 9/2004 | Hashiba et al. | 310/201 |
| 6,798,108 | B2* | 9/2004 | Takahashi et al. | 310/239 |
| 6,809,437 | B2* | 10/2004 | Oohashi et al. | 310/45 |
| 6,815,864 | B2* | 11/2004 | Tanaka et al. | 310/263 |
| 6,841,856 | B1* | 1/2005 | Hayashi et al. | 310/43 |
| 6,876,111 | B2* | 4/2005 | Kuroda et al. | 310/90 |
| 6,882,069 | B1* | 4/2005 | Kashihara et al. | 310/68 D |
| 6,933,652 | B2* | 8/2005 | Higashino et al. | 310/260 |
| 6,946,759 | B2* | 9/2005 | Asao et al. | 310/45 |
| 6,977,475 | B2* | 12/2005 | Kuribayashi et al. | 318/140 |
| 6,979,927 | B2* | 12/2005 | Kometani et al. | 310/193 |
| 7,589,481 | B2* | 9/2009 | Sonoda et al. | 310/52 |
| 2002/0011753 | A1* | 1/2002 | Asao et al. | 310/45 |
| 2002/0011757 | A1* | 1/2002 | Tanaka et al. | 310/263 |
| 2002/0017825 | A1* | 2/2002 | Oohashi et al. | 310/207 |
| 2002/0043882 | A1* | 4/2002 | Tanaka et al. | 310/71 |
| 2002/0047450 | A1* | 4/2002 | Asao et al. | 310/184 |
| 2002/0047482 | A1* | 4/2002 | Oohashi et al. | 310/263 |
| 2002/0047483 | A1* | 4/2002 | Oohashi et al. | 310/263 |
| 2002/0105242 | A1* | 8/2002 | Takahashi et al. | 310/91 |
| 2002/0113505 | A1* | 8/2002 | Takahashi et al. | 310/71 |
| 2002/0180299 | A1* | 12/2002 | Oohashi et al. | 310/184 |
| 2003/0030341 | A1* | 2/2003 | Asao et al. | 310/91 |
| 2003/0030964 | A1* | 2/2003 | Oohashi et al. | 361/306.1 |
| 2003/0102734 | A1* | 6/2003 | Asao | 310/68 D |
| 2003/0102735 | A1* | 6/2003 | Asao | 310/68 D |
| 2003/0141854 | A1* | 7/2003 | Kuribayashi et al. | 322/28 |
| 2004/0108784 | A1* | 6/2004 | Higashino et al. | 310/179 |
| 2004/0135443 | A1* | 7/2004 | Tajima et al. | 310/68 D |
| 2004/0160138 | A1* | 8/2004 | Kuroda et al. | 310/90 |
| 2004/0174089 | A1* | 9/2004 | Maeda et al. | 310/263 |
| 2004/0211613 | A1* | 10/2004 | Asao et al. | 180/291 |
| 2004/0256924 | A1* | 12/2004 | Ueda et al. | 310/60 A |
| 2004/0256927 | A1* | 12/2004 | Oohashi et al. | 310/68 D |
| 2005/0116581 | A1* | 6/2005 | Fujita et al. | 310/263 |
| 2005/0127777 | A1* | 6/2005 | Kashihara et al. | 310/239 |
| 2005/0156480 | A1* | 7/2005 | Imai et al. | 310/263 |
| 2006/0033396 | A1* | 2/2006 | Kashihara et al. | 310/216 |

FOREIGN PATENT DOCUMENTS

| | | | |
|---|---|---|---|
| JP | 09-084294 | A | 3/1997 |
| JP | 11-02/903 | A | 1/1999 |
| JP | 11027903 | A * | 1/1999 |
| JP | 2000-134950 | A | 5/2000 |
| JP | 2000134950 | A * | 5/2000 |
| JP | 2002-159161 | A | 5/2002 |
| JP | 2002-345211 | A | 11/2002 |
| JP | 2004-274992 | A | 9/2004 |
| JP | 2005176459 | A * | 6/2005 |

* cited by examiner

INVERTER-INTEGRATED ROTATING ELECTRIC MACHINE HAVING IMPROVED THERMAL CHARACTERISTICS

BACKGROUND OF THE INVENTION

1. Field of the Invention

The present invention relates generally to a rotating electric machine with a built-in inverter (inverter-integrated rotating electric machine), and more particularly, to an inverter-integrated rotating electric machine having improved thermal characteristics.

2. Description of the Background Art

Inverter-integrated rotating electric machines are conventionally known. For example, Japanese Patent Application Publication No. 2004-274992 discloses an inverter-integrated rotating electric machine, in which switching devices, a control circuit and a large number of wirings carrying small currents, for instance, are accommodated in a case to provide mechanical and electrical safety.

A conventional inverter-integrated rotating electric machine is typically structured in such a way that a control circuit and a power circuit including switching devices are arranged in close proximity to each other in a case, so that heat generated by the switching devices would easily transfer to the control circuit. This conventional structure has a problem that the control circuit tends to be damaged by heat buildup. If the control circuit is isolated from the power circuit by providing a partition for preventing heat transfer within the case, there arises another problem that the provision of the partition results in an increase in the size of the case. A further problem of the conventional structure is that complex wirings and connections are needed to be made, because the power circuit and the control circuit are arranged on a common plane in the case.

SUMMARY OF THE INVENTION

In light of the aforementioned problems of the prior art, it is an object of the present invention to provide an inverter-integrated rotating electric machine, in which temperature increase of a control circuit is suppressed to realize excellent thermal characteristics.

According to the invention, an inverter-integrated rotating electric machine includes an enclosure in which a vent hole is formed, an alternating current (AC) motor accommodated in the enclosure, the AC motor including a rotor and a fan whose rotation introduces external air into the enclosure from outside through the vent hole, the fan being fixed to the rotor, and an inverter unit accommodated in the enclosure and disposed in the vent hole. The inverter unit includes a power circuit portion and a control circuit portion whose control board is housed in a case which thermally isolates the control board from the power circuit portion. The power circuit portion is located at a position facing the fan and the control circuit portion is located on an upstream side of the power circuit portion with respect to an inflow of the external air. Signal lines from the power circuit portion are connected to signal lines from the control board through at least one hole formed in the case.

The inverter-integrated rotating electric machine thus structured can minimize heat transfer from the power circuit portion to the control circuit portion, thereby offering excellent thermal characteristics.

These and other objects, features and advantages of the invention will become more apparent upon a reading of the following detailed description in conjunction with the accompanying drawings.

DESCRIPTION OF THE PREFERRED EMBODIMENTS

Specific embodiments of the invention are now described with reference to the accompanying drawings.

First Embodiment

Figure 1:
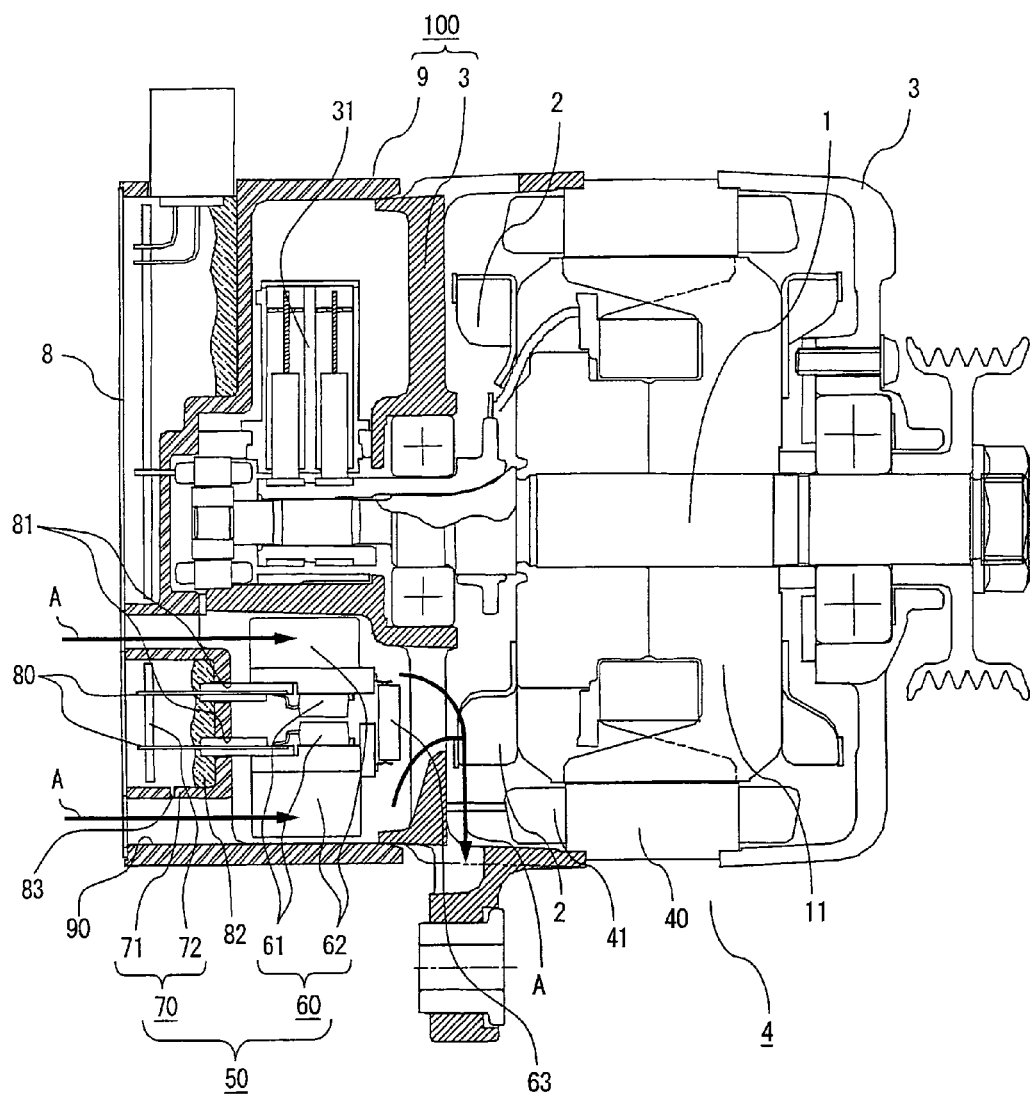
FIG. 1 is a cross-sectional view showing the structure of an inverter-integrated rotating electric machine according to a first embodiment of the invention.

FIG. 1 is a cross-sectional view showing the structure of an inverter-integrated rotating electric machine according to a first embodiment of the invention. Referring to FIG. 1, the inverter-integrated rotating electric machine has an enclosure 100 made up of a motor housing 3 and an outer case 9, the enclosure 100 accommodating an AC motor 4 which includes a stator 40 having stator coils 41 housed in the motor housing 3, a rotor 11 fixedly mounted on a rotary shaft 1 and a fan 2 whose rotation introduces external air into the enclosure 100 from outside, the fan 2 being fixed to the rotor 11, as well as an inverter unit 50 for converting input direct current (DC) power into AC power. The inverter unit 50 is disposed in a vent hole 90 formed in the enclosure 100 through which the external air is introduced from outside into the enclosure 100 along directions shown by arrows A as the fan 2 rotates. The inverter unit 50 includes a power circuit portion 60 and a control circuit portion 70. Located at a position facing the fan 2, the power circuit portion 60 includes a plurality of switching devices 61 which constitute an inverter circuit for feeding electric power to the stator coils 41 of the AC motor 4 and heat sinks 62 to which the switching devices 61 are affixed. The power circuit portion 60 is connected to a smoothing capacitor 63.

The control circuit portion 70 includes a control board 72 housed in a case 71 which thermally isolates the control board 72 from the power circuit portion 60. As shown in FIG. 1, a front side of the case 71 is closed by a front cover 8, and the control circuit portion 70 is disposed on an upstream side of the power circuit portion 60 with respect to an inflow of the external air. Resin-molded signal lines 80 from the power circuit portion 60 are passed through holes 81 formed in the case 71 and connected to signal lines from the control board 72. The holes 81 are formed in an inside wall of the case 71 facing the power circuit portion 60 such that the signal lines 80 are run through the holes 81 and connected to the signal lines from the control board 72 by a routing of a minimum length. Gaps between the signal lines 80 and peripheries of the holes 81 are sealed by resin 82 deposited in the case 71. A drain hole 83 is formed in the case 71 to connect the interior thereof to the vent hole 90. Brushes 31 through which field currents are fed to the rotor 11 of the AC motor 4 are located at positions at approximately the same distance from an end of the rotary shaft 1 as the power circuit portion 60.

In the above-described structure of the inverter-integrated rotating electric machine of the first embodiment, the control board 72 is thermally isolated from the power circuit portion 60 by the case 71 and heat generated in the power circuit portion 60 is transmitted to the control circuit portion 70 only through the signal lines, so that the amount of heat transferred from the power circuit portion 60 to the control circuit portion 70 is minimized. This structure of the embodiment makes it possible to achieve high cooling performance by facilitating equipment cooling design. As the power circuit portion 60 and the control circuit portion 70 are separated from each other, both portions 60, 70 are isolated and, as a consequence, the power circuit portion 60 and the control circuit portion 70 can be constructed by using appropriate types and quantities of materials. This allows for cost reduction and achievement of high insulation performance, and thus an improvement in the reliability of the switching devices 61 in the power circuit portion 60. According to the structure of the embodiment, the signal lines 80 from the power circuit portion 60 can be easily connected to the signal lines from the control board 72 through the holes 81 formed in the inside wall of the case 71 after separately assembling the power circuit portion 60 and the control circuit portion 70, so that handling in processes performed before assembly of the power circuit portion 60 and the control circuit portion 70 and after interconnection thereof is simplified, resulting in enhanced ease of assembly. Further advantages of the structure of the embodiment are simple interconnection between the power circuit portion 60 and the control circuit portion 70 and low wiring resistance, so that high stiffness and vibration-resistant capability can be achieved. The gaps between the signal lines 80 and the peripheries of the holes 81 are sealed by the resin 82 deposited in the case 71 as stated above. This enables sealing of the case 71 with a small amount of the resin 82, yet preventing intrusion of water and dust into the case 71. Furthermore, the structure of the embodiment ensures a high insulating property of the case 71 to protect the control board 72 as a small amount of water formed in the case 71 by condensation, for instance, is drained through the drain hole 83 made in the case 71.

Second Embodiment

Figure 2:
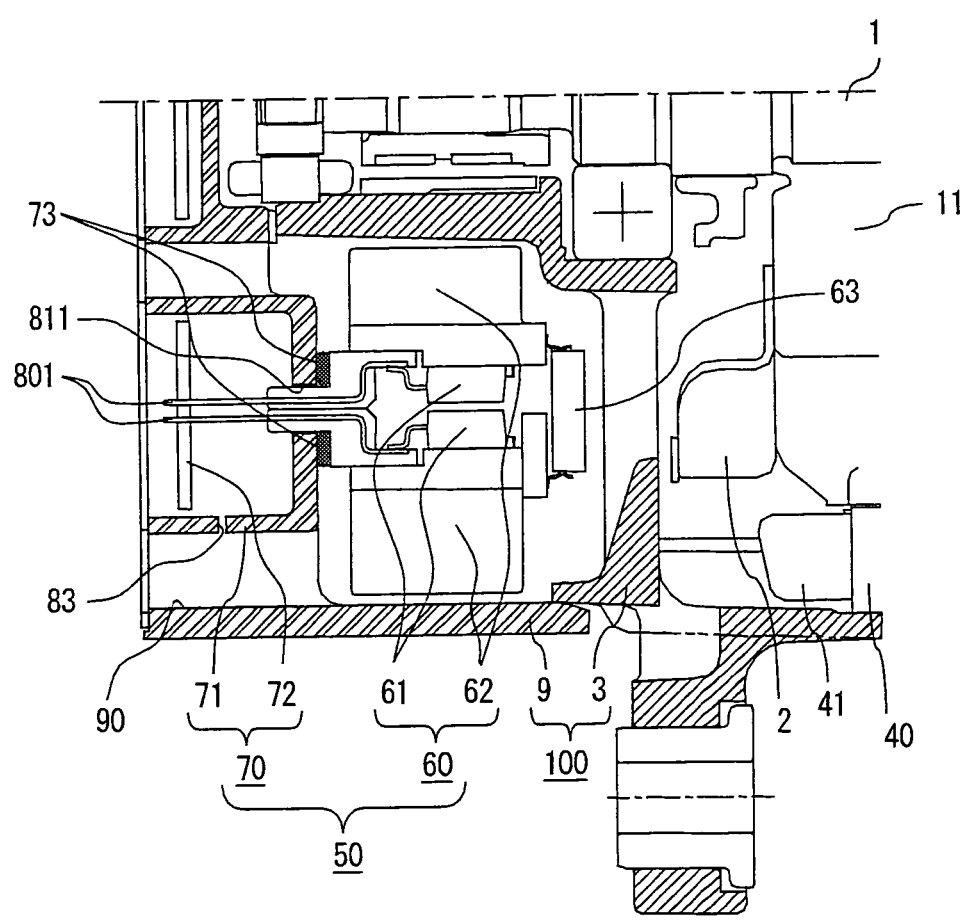
FIG. 2 is a cross-sectional view showing the structure of a principal part of an inverter-integrated rotating electric machine according to a second embodiment of the invention.

FIG. 2 is a cross-sectional view showing the structure of a principal part of an inverter-integrated rotating electric machine according to a second embodiment of the invention, in which elements identical or similar to those of the first embodiment are designated by the same reference numerals.

The inverter-integrated rotating electric machine of the second embodiment is obtained by modifying part of the inverter-integrated rotating electric machine of the first embodiment. Shown in FIG. 2 is an enlarged view of the modified part. What is characteristic of this embodiment is that resin-molded signal lines 801 from the power circuit portion 60 are routed through a specified single location, that is, a central portion of the inside wall of the case 71 facing the power circuit portion 60 in an illustrated example of FIG. 2, where the "specified single location" refers to any location convenient for determining circuit layout of the control board 72. This arrangement helps provide enhanced ease of assembly and enables efficient use of a space available on the control board 72. In this embodiment, the signal lines 801 are together passed through a single hole 811 formed in the central portion of the inside wall of the case 71, and a waterproof packing (sealing ring) 73 is fitted in the hole 811 to seal a gap between the signal lines 801 and a periphery of the hole 811 for preventing intrusion of water and dust into the case 71.

The inverter-integrated rotating electric machine of the second embodiment thus structured confers such advantages as enhanced ease of assembly and efficient use of the space on the control board 72, not to mention the same advantages as the aforementioned first embodiment. This is because the signal lines 801 from the power circuit portion 60 connected to the control board 72 are collected to the aforementioned specified single location (the central portion of the inside wall of the case 71). Furthermore, the use of the waterproof packing 73 eliminates the need for applying resin and hardening the same in a curing oven while providing sealing performance adequate for preventing intrusion of water and dust into the case 71.

Third Embodiment

Figure 3:
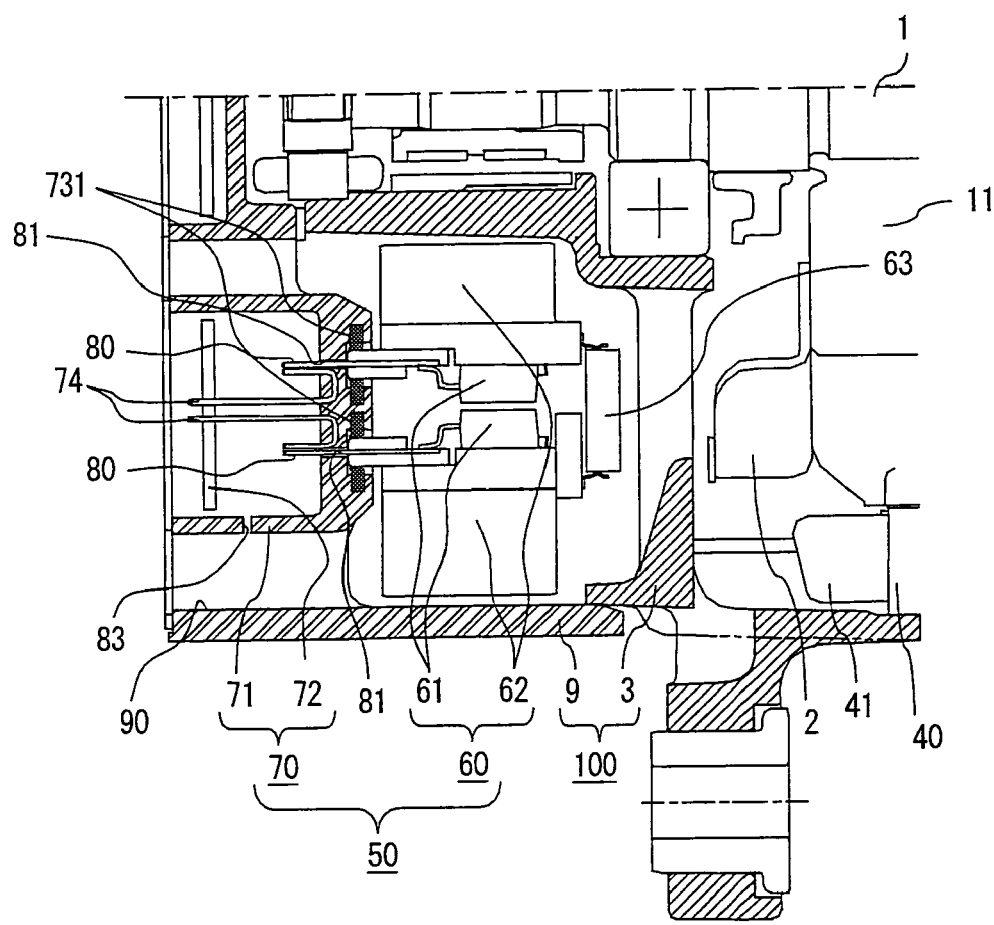
FIG. 3 is a cross-sectional view showing the structure of a principal part of an inverter-integrated rotating electric machine according to a third embodiment of the invention.

FIG. 3 is a cross-sectional view showing the structure of a principal part of an inverter-integrated rotating electric machine according to a third embodiment of the invention, in which elements identical or similar to those of the foregoing embodiments are designated by the same reference numerals.

The inverter-integrated rotating electric machine of the third embodiment is obtained by modifying part of the inverter-integrated rotating electric machine of the first embodiment. Shown in FIG. 3 is an enlarged view of the modified part. What is characteristic of this embodiment is that the control circuit portion 70 includes in the case 71 thereof wiring conductors 74 made of electrically conductive elements which are connected to the signal lines from the control board 72 at specified points and molded in the case 71. The resin-molded signal lines 80 from the power circuit portion 60 are passed through the holes 81 and connected to the wiring conductors 74, whereby the signal lines 80 from the power circuit portion 60 are connected to the signal lines from the control board 72.

In addition, the gaps between the signal lines 80 and the peripheries of the holes 81 formed in the inside wall of the case 71 facing the power circuit portion 60 are sealed by waterproof packings 731 fitted in the holes 81 in a manner that the case 71 and the waterproof packings 731 together form a single structure.

The inverter-integrated rotating electric machine of the third embodiment thus structured confers such advantages as ease of design and simplification of wire connections in the power circuit portion 60, not to mention the same advantages as the aforementioned foregoing embodiments. This is because the signal lines 80 from the power circuit portion 60 are connected to the signal lines from the control board 72 via the wiring conductors 74. Furthermore, since the waterproof packings 731 are integrally fitted in the case 71, the gaps between the signal lines 80 from the power circuit portion 60 and the peripheries of the holes 81 in the case 71 can be easily sealed, resulting in enhanced ease of assembly.

Fourth Embodiment

Figure 4:
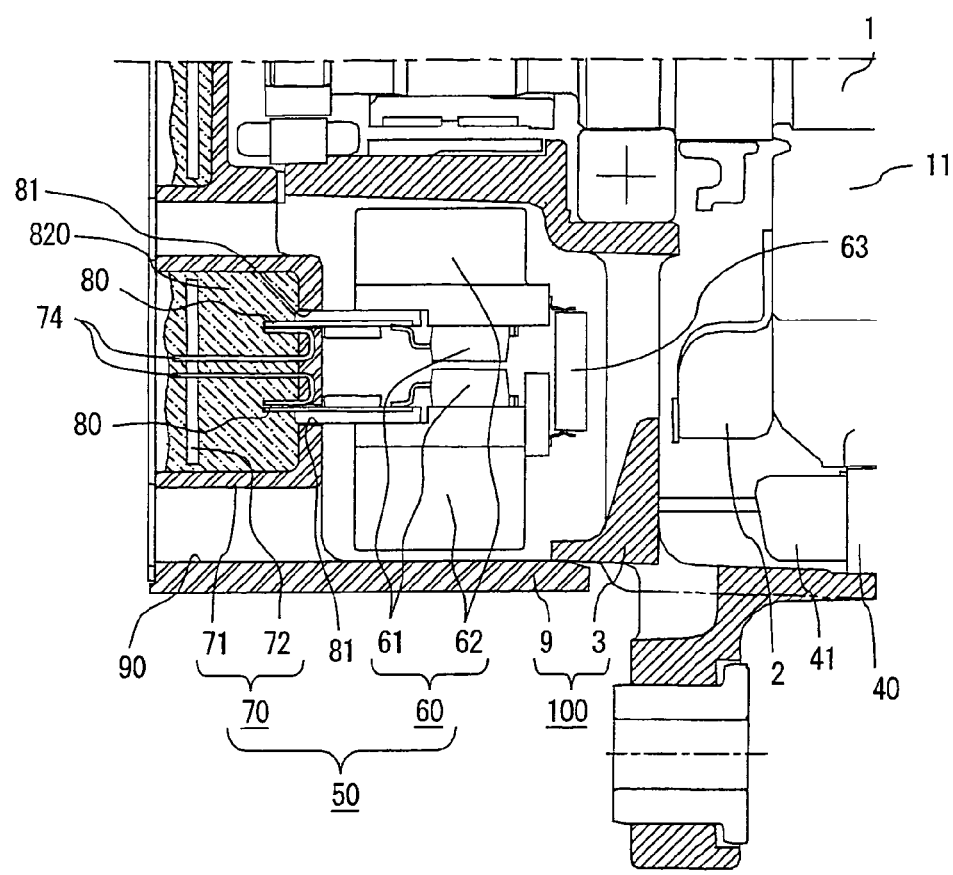
FIG. 4 is a cross-sectional view showing the structure of a principal part of an inverter-integrated rotating electric machine according to a fourth embodiment of the invention.

FIG. 4 is a cross-sectional view showing the structure of a principal part of an inverter-integrated rotating electric machine according to a fourth embodiment of the invention, in which elements identical or similar to those of the foregoing embodiments are designated by the same reference numerals.

The inverter-integrated rotating electric machine of the fourth embodiment is obtained by modifying part of the inverter-integrated rotating electric machine of the first embodiment. Shown in FIG. 4 is an enlarged view of the modified part. What is characteristic of this embodiment is that the gaps between the peripheries of the holes 81 formed in the inside wall of the case 71 facing the power circuit portion 60 and the signal lines 80 passed through the holes 81 are sealed by a large quantity of resin 820, and not a small quantity, deposited in the case 71 up to a point where the control board 72 is fully embedded in the resin 820.

The inverter-integrated rotating electric machine of the fourth embodiment thus structured confers such advantages as ease of sealing the inside wall of the case 71 facing the power circuit portion 60 as well as improved insulating property and environmental resistance of the entire control board 72, not to mention the same advantages as the aforementioned foregoing embodiments.

Fifth Embodiment

Figure 5:
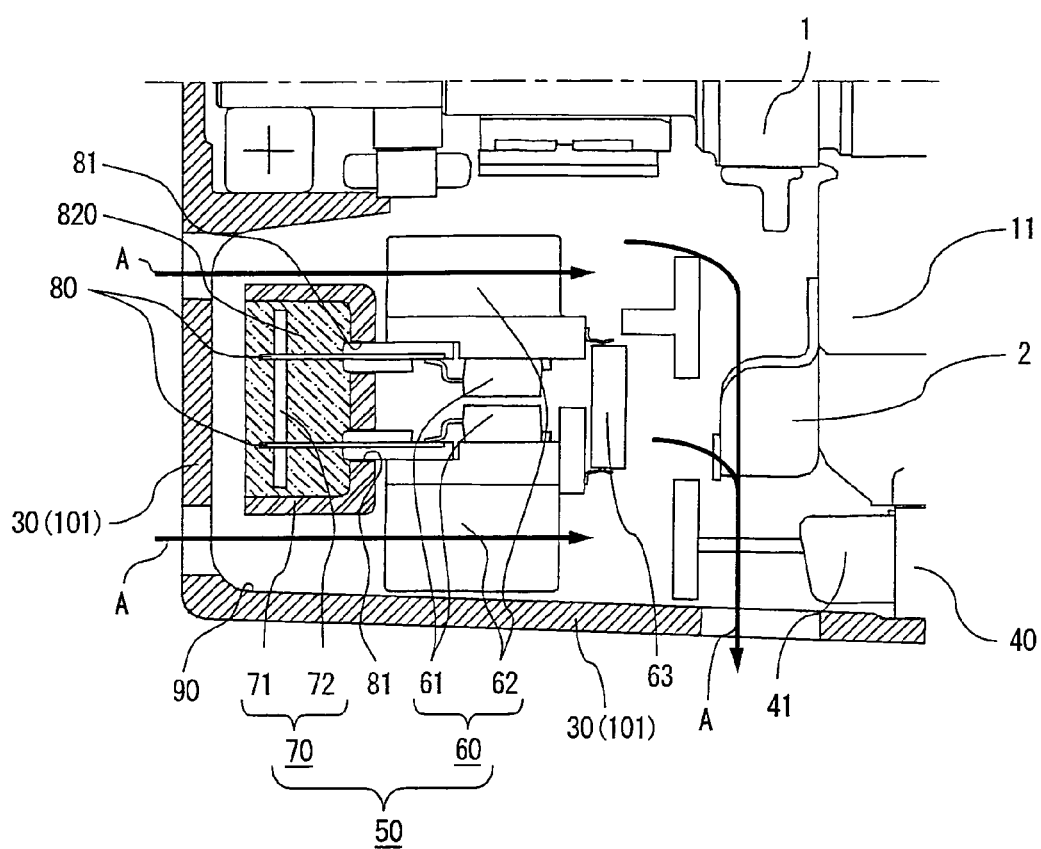
FIG. 5 is a cross-sectional view showing the structure of a principal part of an inverter-integrated rotating electric machine according to a fifth embodiment of the invention.

FIG. 5 is a cross-sectional view showing the structure of a principal part of an inverter-integrated rotating electric machine according to a fifth embodiment of the invention, in which elements identical or similar to those of the foregoing embodiments are designated by the same reference numerals.

The inverter-integrated rotating electric machine of the fifth embodiment is obtained by modifying part of the inverter-integrated rotating electric machine of the first embodiment. Shown in FIG. 5 is an enlarged view of the modified part. What is characteristic of this embodiment is that an enclosure 101 is made up of a motor housing 30 alone which accommodates both the AC motor 4 and the inverter unit 50, and the inverter unit 50 is disposed in a vent hole 90 through which air is introduced from outside into the enclosure 101 along directions shown by arrows A as the fan 2 rotates.

The inverter-integrated rotating electric machine of the fifth embodiment thus structured confers an advantage that all the internal components can be housed in the single enclosure 101, not to mention the same advantages as the aforementioned foregoing embodiments.

Needless to say, the structures of the first to fifth embodiments may be combined as appropriate to take advantage of the individual embodiments thus far described.

What is claimed is:

1. An inverter-integrated rotating electric machine comprising:
   an enclosure in which a vent hole is formed;
   an AC motor accommodated in said enclosure, said AC motor including a rotor and a fan whose rotation introduces external air into said enclosure from outside through the vent hole, the fan being fixed to the rotor; and
   an inverter unit accommodated in said enclosure and disposed in the vent hole, said inverter unit including a power circuit portion located at a position facing the fan and a control circuit portion whose control board is housed in a case disposed in the vent hole, the case thermally isolating the control board from the power circuit portion, the control circuit portion being located on an upstream side of the power circuit portion with respect to an inflow of the external air, such that the power circuit portion is disposed closer to the fan than the control circuit portion;
   wherein signal lines from the power circuit portion are connected to signal lines from the control board through a hole formed in said case, and
   wherein the power circuit portion is not housed in any case disposed in the vent hole.

2. The inverter-integrated rotating electric machine according to claim 1, wherein the hole is formed in a wall of said case facing the power circuit portion.

3. The inverter-integrated rotating electric machine according to claim 1, wherein the signal lines from the power circuit portion are collected to a specified single location and passed through the hole formed in said case.

4. The inverter-integrated rotating electric machine according to claim 1, said inverter unit further including wiring conductors which are connected to the signal lines from the control board at specified points, the signal lines from the power circuit portion being connected to the signal lines from the control board via the wiring conductors.

5. The inverter-integrated rotating electric machine according to claim 1, wherein resin is deposited in said case to seal a gap between the signal lines from the power circuit portion and a periphery of the hole formed in said case through which the signal lines from the power circuit portion are passed.

6. The inverter-integrated rotating electric machine according to claim 1, wherein a waterproof packing is fitted in the hole formed in said case to seal a gap between the signal lines from the power circuit portion and a periphery of the hole through which the signal lines from the power circuit portion are passed.

7. The inverter-integrated rotating electric machine according to claim 6, wherein the waterproof packing is integrally fitted in said case in a manner that said case and the waterproof packing together form a single structure.

8. The inverter-integrated rotating electric machine according to claim 1, wherein a drain hole connected to the vent hole is formed in the case.

9. The inverter-integrated rotating electric machine according to claim 1, wherein resin is deposited in said case up to a point where the control board is fully embedded in the resin.

10. The inverter-integrated rotating electric machine according to claim 8, wherein the case comprises side walls and a cover to entirely enclose the control board therein, and wherein the drain hole is provided through one of the side walls other than a side wall containing the hole for the signal lines from the power circuit portion connected to the signal lines from the control board.

* * * * *